Dec. 24, 1929.  A. B. WELTY  1,740,719
STRAW WALKER RACK
Filed April 27, 1928
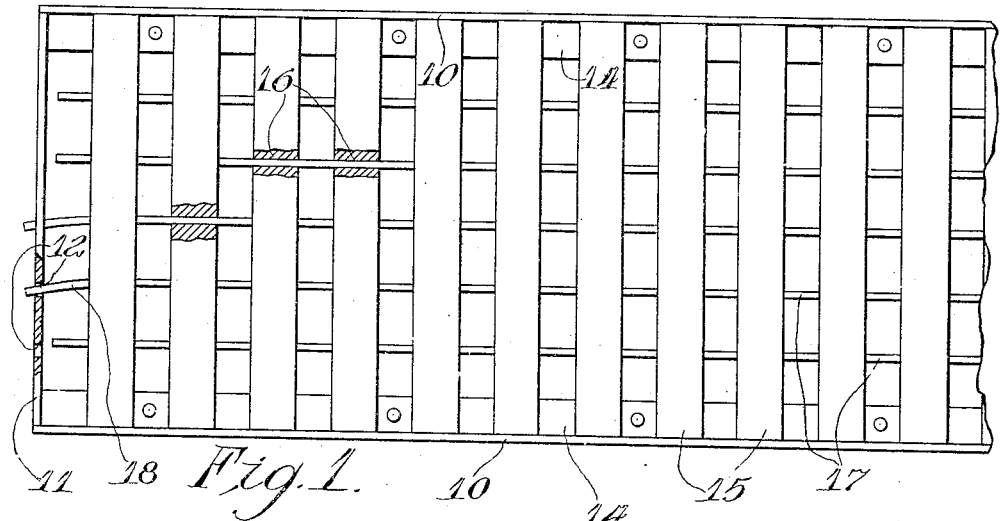
Fig. 1.
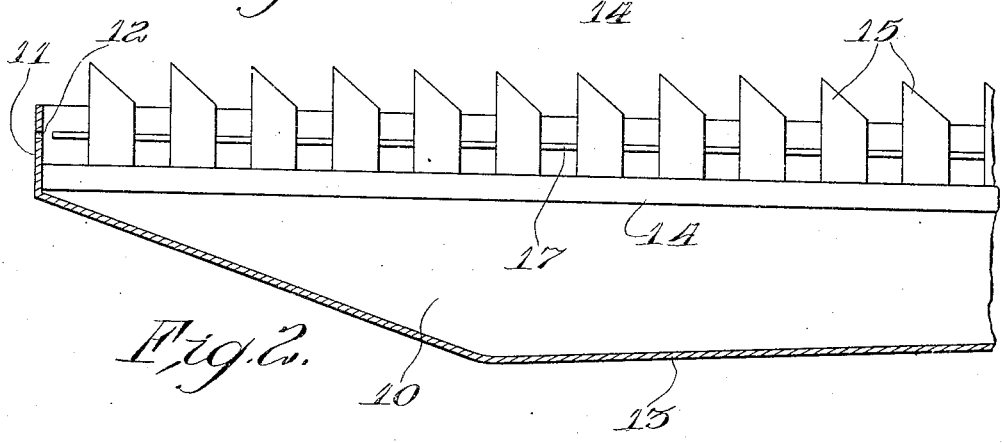
Fig. 2.
Fig. 3.
Fig. 4.
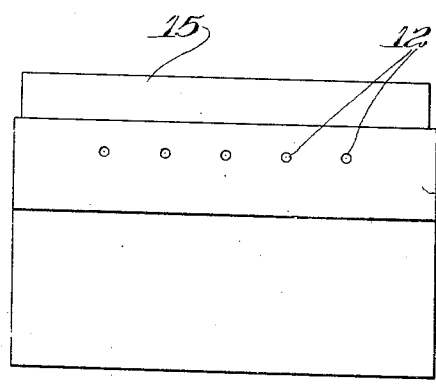
Inventor.
Albert B. Welty.
By N. P. Dasratt
Atty Patented Dec. 24, 1929

1,740,719

UNITED STATES PATENT OFFICE

ALBERT B. WELTY, OF CHICAGO, ILLINOIS, ASSIGNOR TO INTERNATIONAL HARVESTER COMPANY, A CORPORATION OF NEW JERSEY

STRAW-WALKER RACK

Application filed April 27, 1928. Serial No. 273,203.

This invention is in straw walker racks as employed in threshing machines, and particularly in harvester threshers.

These straw walker racks as well known in the art receive mixed straw and grain from the threshing mechanism, their purpose being to agitate the material to separate the grain from the straw. In operating harvester threshers in the field, varying grain conditions naturally are encountered. When the grain is heavy, a large amount of straw is cut and handled, and, obviously, when the grain is light, a lesser quantity of straw is cut and handled. Also in some conditions, the straw is very brittle, causing it to be broken into various degrees of fineness in the threshing operation. It must, therefore, be appreciated that these straw handling racks are called upon under these varied and changeable conditions to handle varying amounts of material.

The object of this invention is to provide an improved straw walker rack structure in which adjustment may be effected to meet these varied operating conditions, and a construction that will operate successfully whether the amount of straw being handled be large or small.

Such object is accomplished by so constructing the racks that the amount of opening through which the grain falls is made adjustable. More particularly, it is accomplished in the present instance by providing in connection with the usual straw rack, a series of longitudinally arranged rods in spaced relation, these rods being made removable whereby the amount of material passing through the rack may be controlled. The invention particularly contemplates the provision of a simplified locking arrangement for securing these rods in adjusted position within the racks and against endwise displacement.

In the accompanying sheet of drawings showing the invention,—

Figure 1 shows a top plan view of the improved straw walker rack;

Figure 2 is a longitudinal sectional view of the construction shown in Figure 1;

Figure 3 is a detail view of one of the improved rods; and

Figure 4 is a view of the rear end of the rack.

The straw walker rack embodies the usual casing comprising side walls 10 and a rear, end wall 11 formed with spaced apertures 12. A sloped bottom is shown at 13. The side walls carry longitudinal supports 14 which supports carry transverse, spaced slats 15. The slats form the usual cross slats of the straw racks and may be constructed of wood or metal. In the present disclosure, they are wood. The cross slats are provided with aligned apertures 16, which apertures are slightly offset with respect to the openings 12, as best shown in Figure 1.

Slidably fitted through the openings 12 in the end wall 11, and through each set of aligned openings 16 in the slats 15, are stiff, spring wire rods 17. It will be understood that the rods are of sufficiently small gauge to permit easy flexing of the same, so that the bent ends 18 will readily pass through the apertures 12 and then, when the rods have been pushed through, all the way to their home positions, their rear ends shown at 18 which were temporarily bent or sprung will snap back to their normal straight positions. After the rear, temporarily bent end of each rod has passed its opening 12 and released therefrom as shown in Figure 2, the said end straightens out and assumes a position offset from said opening so that any reverse endwise displacement will be thwarted, because the offset end will abut the solid portion of the end wall 11, as will be readily understood. Thus, the rods are self-locking against endwise displacement.

From the above description it will be seen that there has been provided a simple and efficient construction, well adapted for the purpose intended. When the rack is handling heavy grain, it will be found expedient to remove certain of the rods, and, in order to do this, it is merely necessary to flex the end 18 of the rods and slide them rearwardly out of the apertures 12, as will be clear. This will increase the rod spacings to permit larger amounts of unthreshed heads to pass through the straw walker racks onto the return pans 13 comprising the sloped bottom heretofore described. When the rack is handling light grain, it will be found expedient to use more of the longitudinal rods, thereby preventing too much of the straw from passing downwardly through the openings.

It is the intention to cover all such changes and modifications as do not depart from the spirit and scope of this invention as indicated by the accompanying claims.

What is claimed is:

1. In a straw walker, a casing having an end wall provided with openings, a plurality of cross slats carried by the casing and having aligned openings, said openings being offset with respect to the openings in said end wall, and flexible removable rods passed through all of said openings to mount the same in the slats.

2. In a straw walker, a casing having an end wall provided with openings, a plurality of cross slats carried by the casing and having aligned openings, said openings being offset with respect to the openings in said end wall, and rods removably mounted in the aligned slat openings and adapted to be inserted or removed by passing the same through the end wall openings, said rods being thereby self-locking for preventing accidental endwise displacement thereof.

3. In a straw walker, a casing having an end wall provided with openings, a plurality of cross slats carried by the casing and having aligned openings, said openings being offset with respect to the openings in said end wall, and flexible wire rods removably mounted in the aligned slat openings and adapted to be inserted or removed by passing the same through the end wall openings, whereby said rods in being passed through the end wall become temporarily slightly bent so that they will automatically assume an offset position relative to the end wall openings and abut the solid portion of the end wall to prevent accidental endwise displacement of the rods when they are mounted in the slats.

4. In a straw walker, a casing having an end wall provided with openings, a plurality of cross slats carried by the casing and having aligned openings, said openings being offset with respect to the openings in said end wall, removable rods passed through all of said openings to mount the same in the slats, each of said rods including a resilient end portion adapted to be temporarily flexed to pass through the end wall openings and then spring back to its normal position to abut the end wall offset from the holes to prevent endwise accidental displacement of the rods.

5. In a straw walker, a casing, cross slats having aligned openings, an end wall having openings offset relative to the slat openings, and rods mounted in the slat openings and prevented from endwise accidental displacement through the end wall by reason of the offset position of the openings therein.

In testimony whereof I affix my signature.

ALBERT B. WELTY.